United States Patent
Fukushima et al.

(10) Patent No.: US 12,255,283 B2
(45) Date of Patent: Mar. 18, 2025

(54) METHOD OF MANUFACTURING SOLID ELECTROLYTE SHEET, AND SOLID ELECTROLYTE SHEET

(71) Applicant: HONDA MOTOR CO., LTD., Tokyo (JP)

(72) Inventors: Takehiro Fukushima, Saitama (JP); Yayoi Matsushita, Saitama (JP); Yasuro Katsuyama, Saitama (JP); Yuichi Tajiri, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 515 days.

(21) Appl. No.: 17/678,019

(22) Filed: Feb. 23, 2022

(65) Prior Publication Data

US 2022/0311048 A1  Sep. 29, 2022

(30) Foreign Application Priority Data

Mar. 26, 2021  (JP) ................ 2021-054220

(51) Int. Cl.
*H01M 10/0562* (2010.01)
*H01M 10/052* (2010.01)
*H01M 10/0585* (2010.01)

(52) U.S. Cl.
CPC ..... *H01M 10/0562* (2013.01); *H01M 10/052* (2013.01); *H01M 10/0585* (2013.01);
(Continued)

(58) Field of Classification Search
CPC ..... H01M 10/0562; H01M 2300/0065; H01M 2300/0068; H01M 2300/0094; H01M 10/052; H01M 10/0585
See application file for complete search history.

(56) References Cited

U.S. PATENT DOCUMENTS

2015/0147659 A1  5/2015  Kato
2019/0372149 A1  12/2019  Cho et al.
(Continued)

FOREIGN PATENT DOCUMENTS

CN  108598563 A  *  9/2018  ........ H01M 10/0525
CN  110192302 A     8/2019
(Continued)

OTHER PUBLICATIONS

Machine Translation of WO 2020130695A (Year: 2020).*
(Continued)

*Primary Examiner* — Gregg Cantelmo
(74) *Attorney, Agent, or Firm* — CKC & Partners Co., LLC

(57) ABSTRACT

Provided is a method of manufacturing a solid electrolyte sheet, and a solid electrolyte sheet that can improve battery output performance, and can suppress interfacial peeling and short-circuiting between the solid electrolyte layer and the electrode layer. A method of manufacturing a solid electrolyte sheet includes: a first step of a base with coating slurry containing a solid electrolyte; a second step of drying the slurry on the base to form a solid electrolyte layer; a third step of stacking a sheet-like three-dimensional structure on the top surface of the solid electrolyte layer; a fourth step of coating the inside and top of the three-dimensional structure with slurry containing a solid electrolyte; and a fifth step of drying the slurry coated on the inside and on the top of the three-dimensional structure to obtain a solid electrolyte sheet filled with the solid electrolyte.

2 Claims, 5 Drawing Sheets

(52) U.S. Cl.
CPC ............... *H01M 2300/0065* (2013.01); *H01M 2300/0068* (2013.01); *H01M 2300/0094* (2013.01)

(56) References Cited

U.S. PATENT DOCUMENTS

2021/0320332 A1    10/2021   Lee et al.
2021/0336294 A1    10/2021   Kim et al.

FOREIGN PATENT DOCUMENTS

| CN | 112204797 A | 1/2021 | |
|---|---|---|---|
| JP | 2007087680 A | 4/2007 | |
| JP | 2014026747 A | 2/2014 | |
| JP | 5930035 B2 | 6/2016 | |
| JP | 2019220455 A | 12/2019 | |
| WO | 2020130695 A1 | 6/2020 | |
| WO | WO-2020190029 A1 * | 9/2020 | .......... H01M 10/052 |

OTHER PUBLICATIONS

Machine Translation of WO 2020190029A (Year: 2020).*
Machine Translation of CN-108598563-A (Year: 2018).*
Office Action issued in the CN Patent Application No. 202210183967.2, mailed on Apr. 15, 2024.

* cited by examiner

METHOD OF MANUFACTURING SOLID ELECTROLYTE SHEET, AND SOLID ELECTROLYTE SHEET

This application is based on and claims the benefit of priority from Japanese Patent Application 2021-054220, filed on 26 Mar. 2021, the content of which is incorporated herein by reference.

BACKGROUND OF THE INVENTION

Field of the Invention

The present invention relates to a method of manufacturing a solid electrolyte sheet, and a solid electrolyte sheet.

Related Art

In recent years, the demand for high-capacity and high-output batteries has been rapidly increasing due to the widespread use of electric and electronic devices of various sizes, such as automobiles, personal computers, and cell phones. For example, solid-state batteries including solid electrolyte materials are currently attracting attention because they are superior to conventional batteries including organic electrolyte solutions as electrolytes in that their electrolytes are non-flammable, which improves safety and they have higher energy density (see, for example, Patent Document 1).

A solid-state battery is composed of a laminate in which a positive electrode layer, a solid electrolyte layer, and a negative electrode layer are stacked. The solid electrolyte layer has the function of conducting ions and as a separator to prevent a short circuit between the negative electrode active material layer and the positive electrode active material layer.

A method has been disclosed of manufacturing a solid electrolyte layer consisting of two layers made of the same solid electrolyte to suppress the formation of pinholes and the resulting short circuit while reducing the thickness of the solid electrolyte layer for the purpose of improving the volumetric energy density and reducing the resistance (see, for example, Patent Document 2).

One example of a typical method of manufacturing a solid electrolyte layer using a three-dimensional structural material such as a non-woven fabric as a support is to place a porous support on a removable base, coat the support with slurry containing a solid electrolyte, and then remove the removable base, thereby completing the solid electrolyte layer.

Patent Document 1: Japanese Unexamined Patent Application, Publication No. 2014-026747
Patent Document 2: Japanese Patent No. 5930035

SUMMARY OF THE INVENTION

However, conventional manufacture of solid electrolyte layers has the following problems. First, in a solid electrolyte sheet manufactured using a three-dimensional structure as a support on a removable base, the support exists near the surface of the side adjacent to the base. Accordingly, when the surface of the side adjacent to the base from which the base was removed and the electrode layer are bonded together, interfacial peeling is likely to occur on the bonding surface between that surface and the electrode layer. Besides, since the support exists near the bonding surface, the insertion and desorption of lithium ions is inhibited, resulting in an increase in internal resistance and a decrease in battery output performance. Furthermore, the existence of the support near the bonding surface may cause a short circuit.

An object of the present invention, which was made in consideration of the above-mentioned problems, is to provide a method of manufacturing a solid electrolyte sheet, and a solid electrolyte sheet that can improve battery output performance by smoothly inserting and desorbing lithium ions from the solid electrolyte layer to the electrode, and can suppress interfacial peeling and short-circuiting between the solid electrolyte layer and the electrolyte layer by improving the bonding between the solid electrolyte layer and the electrode layer.

(1) The present invention is a method of manufacturing a solid electrolyte sheet filled with a solid electrolyte, including: a first step of coating a base with slurry containing a solid electrolyte; a second step of drying the slurry on the base to form a solid electrolyte layer; a third step of stacking a sheet-like three-dimensional structure on the top surface of the solid electrolyte layer; a fourth step of coating the inside and top of the three-dimensional structure with slurry containing a solid electrolyte; and a fifth step of drying the slurry coated on the inside and on the top of the three-dimensional structure to obtain a solid electrolyte sheet filled with the solid electrolyte.

(2) In the method of manufacturing a solid electrolyte sheet according to (1) above, the three-dimensional structure may be a non-woven fabric.

(3) The present invention also provides a solid electrolyte sheet filled with a solid electrolyte, includes: a sheet-like three-dimensional structure that is provided at a center in a thickness direction, and that is filled with the solid electrolyte thereinside; and solid electrolyte layers that cover front and back sides of the three-dimensional structure, respectively.

(4) In the solid electrolyte sheet according to (3) above, the three-dimensional structure may be a non-woven fabric.

According to the present invention, provided is a method of manufacturing a solid electrolyte sheet, and a solid electrolyte sheet that can improve battery output performance by smoothly inserting and desorbing lithium ions from a solid electrolyte layer to the electrode, and can suppress interfacial peeling and short-circuiting between the solid electrolyte layer and the electrode layer by improving the bonding between the solid electrolyte layer and the electrode layer.

DETAILED DESCRIPTION OF THE INVENTION

One embodiment of the present invention will be described in detail below with reference to the attached drawings.

Method of Manufacturing Solid Electrolyte Sheet

Figure 1:
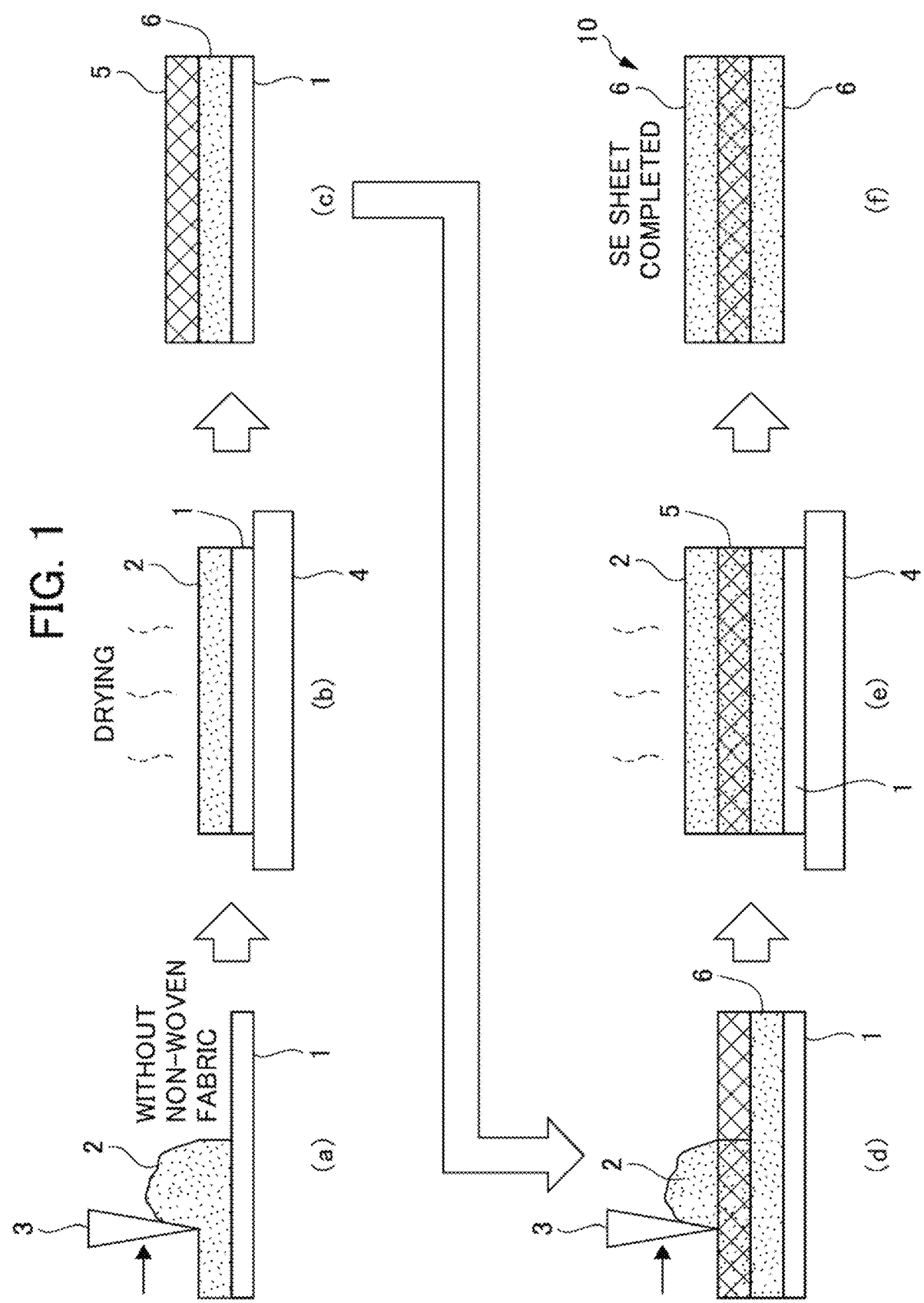
FIG. 1 is a diagram showing a method of manufacturing a solid electrolyte sheet according to one embodiment of the present invention.
Figure 2:
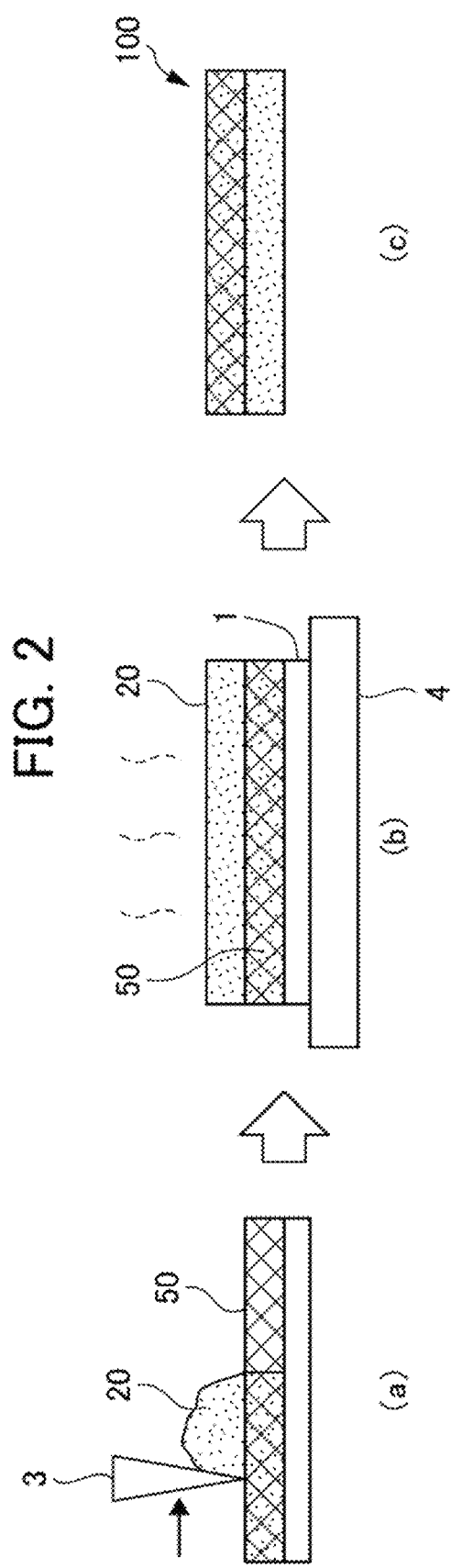
FIG. 2 is a diagram showing a conventional method of manufacturing a solid electrolyte sheet.

FIG. 1 is a diagram showing a method of manufacturing a solid electrolyte sheet according to one embodiment of the present invention. As shown in FIG. 1, the method of manufacturing a solid electrolyte sheet according to this embodiment includes: a first step of coating a base with slurry containing a solid electrolyte; a second step of drying the slurry on the base, thereby forming a solid electrolyte layer; a third step of stacking a sheet-like three-dimensional structure on the top surface of the solid electrolyte layer; a fourth step of coating the inside and top of the three-dimensional structure with slurry containing a solid electrolyte; and a fifth step of drying the slurry inside and on top of the three-dimensional structure, thereby obtaining a solid electrolyte sheet filled with the solid electrolyte.

The method of manufacturing a solid electrolyte sheet according to this embodiment involves the aforementioned first to fifth steps, thereby manufacturing a sheet material to be filled with a solid electrolyte prepared by impregnating a three-dimensional structure with solid electrolyte slurry.

[First Step]

The first step is to coat the base with slurry containing a solid electrolyte (see (a) in FIG. 1). In this method of manufacturing a solid electrolyte sheet according to this embodiment, a removable base is coated with slurry containing a solid electrolyte. Any known method can be adopted as the method of coating the slurry containing the solid electrolyte. Examples include blade coating, spraying, and sputtering. The coating thickness of the slurry containing the solid electrolyte is preferably 2.0 to 4.5 times the thickness of the solid electrolyte sheet after pressing.

The base used in the method of manufacturing the solid electrolyte sheet according to this embodiment is preferably a base having good peeling performance for solid electrolyte layers. The base with good peeling performance for solid electrolyte layers is preferably a base that is heat resistant enough not to be deformed or damaged by heat during the step of drying the slurry containing the solid electrolyte in the second and fourth steps.

The slurry containing the solid electrolyte is not particularly limited, and may be any slurry that contains at least a solid electrolyte capable of conducting lithium ions between the positive electrode and the negative electrode. Examples of such a solid electrolyte include oxide electrolytes or sulfide electrolytes. In addition, other components such as a binder may be added as necessary to the slurry containing the solid electrolyte. In the case where an electrode active material is further added to the slurry containing the solid electrolyte, an application can be made to the method of manufacturing an electrode layer.

The slurry containing the solid electrolyte preferably contains lithium elements. If the solid electrolyte contains lithium elements, its lithium ion conductivity is high.

To be specific, the solid electrolyte is preferably a substance that contains at least lithium sulfide and one or more compounds selected from the group consisting of silicon sulfide, phosphorus sulfide, and boron sulfide as a second component, and $Li_2S$—$P_2S_5$, in particular, is preferred. Such a sulfide-based solid electrolyte is known to have higher lithium ion conductivity than other inorganic compounds, and may also contain sulfides such as $SiS_2$, $GeS_2$, and $B_2S_3$ as well as $Li_2S$–$P_2S_5$. In addition, $Li_3PO_4$, halogen, a halogen compound, or like may be added to the solid electrolyte as appropriate.

The solid electrolyte may contain a lithium ion conductor of an inorganic compound as an inorganic solid electrolyte. Examples of lithium ion conductors include $Li_3N$, LISICON, LIPON ($Li_{3+y}PO_{4-x}N_x$), Thio-LISICON ($Li_{3.25}Ge_{0.25}P_{0.75}S_4$), and $Li_2O$—$Al_2O_3$—$TiO_2$—$P_2O_5$, (LATP).

The solid electrolyte may be amorphous, glassy, crystalline (crystallized glass), or any other structure. When the solid electrolyte is a sulfide solid electrolyte of $Li_2S$—$P_2S_5$, its lithium ion conductivity in the amorphous state is $10^{-4}$ $Scm^{-1}$. On the other hand, its lithium ion conductivity in the crystalline state is $10^{-3}$ $Scm^{-1}$.

The solid electrolyte used in this method of manufacturing a solid electrolyte sheet according to this embodiment preferably contains phosphorus and/or sulfur. If the solid electrolyte further contains phosphorus and/or sulfur, the ionic conductivity of the resulting solid electrolyte sheet can be improved.

Second Step

The second step is to form a solid electrolyte layer by drying the slurry containing the solid electrolyte coated on the base, using a dryer (see (b) in FIG. 1)).

The method of forming the solid electrolyte layer by drying the slurry containing the solid electrolyte coated on the base may be any known drying method that does not deform, during heating, the shape of the coat of slurry containing the solid electrolyte in the form of a thin film. Examples include a method in which the slurry containing the solid electrolyte is dried by heating the base and the slurry containing the solid electrolyte coated on the base while they are placed on a hot plate, or a method in which an electric furnace or other known dryer is used instead of a hot plate.

Third Step

The third step is to stack the three-dimensional structure on the top surface of the solid electrolyte layer formed in the second step (see (c) FIG. 1). A known method can be adopted to stack the three-dimensional structure on the top surface of the solid electrolyte layer. For example, the three-dimensional structure can be simply placed on the top surface of the solid electrolyte layer.

Examples of three-dimensional structures used in the method of manufacturing a solid electrolyte sheet according to this embodiment include mesh, woven fabric, non-woven fabric, embossed material, perforated material, expanded material, and foam, among which non-woven fabric is preferred. If the three-dimensional structure is a non-woven fabric, it is easier to reduce the manufacturing cost related to impregnation because the three-dimensional structure can be rapidly impregnated with solid electrolyte slurry in the method of manufacturing the solid electrolyte sheet according to this embodiment.

The material for the three-dimensional structure is not particularly limited, and can be any sheet material that can constitute a freestanding solid electrolyte sheet. Examples include polyethylene terephthalate, nylon, aramid, $Al_2O_3$, glass, and metal. In the case where any one of non-conductive materials such as polyethylene terephthalate, nylon, aramid, $Al_2O_3$, and glass as the material for the three-dimensional structure here, an application can be made to the method of manufacturing a solid electrolyte sheet. In the case where any one of conductive materials such as metallic materials is used as the material for the three-dimensional structure, an application can be made to the method of manufacturing an electrode layer.

The porosity of the three-dimensional structure is preferably in the range of 60 to 95%. The porosity is more preferably 70 to 90%, particularly 80 to 90%.

The thickness of the three-dimensional structure is preferably in the range of 5 to 30 μm. The thickness of the three-dimensional structure is preferably 5 to 20 μm, particularly 10 to 20 μm. If the thickness is less than 5 μm, short-circuiting may occur between electrodes when a battery is formed, while if the thickness is more than 30 μm, it is difficult to coat the three-dimensional structure with solid electrolyte slurry, making it difficult to provide a solid electrolyte sheet with high energy density.

Fourth Step

The fourth step is to coat the inside and top of the three-dimensional structure with slurry containing a solid electrolyte (see (d) in FIG. 1). Slurry containing the solid electrolyte is applied from the top surface of the three-dimensional structure. While the inside of the three-dimensional structure is entirely coated, the slurry containing the solid electrolyte is also coated on the top of the three-dimensional structure. The method used in the second step can be used to coat the slurry containing the solid electrolyte from the top surface of the three-dimensional structure.

In the fourth step, it is preferable to coat the slurry containing the solid electrolyte so that the three-dimensional structure is located approximately in the center of the solid electrolyte sheet defined with respect to the thickness direction. Coating the slurry containing the solid electrolyte so that the three-dimensional structure is located approximately in the center of the solid electrolyte sheet defined with respect to the thickness direction prevents the three-dimensional structure from being exposed on the surface of the solid electrolyte sheet material, which can suppress interfacial peeling between the solid electrolyte sheet and the electrode layer that may occur when the battery is fabricated using the solid electrolyte sheet formed through the fifth step. Besides, the inhibition of lithium ion migration and insertion/desorption related to the three-dimensional structure, which occurs when the battery is fabricated, can be suppressed.

The coating thickness of the slurry containing the solid electrolyte is preferably thick enough to be able to locate the three-dimensional structure approximately in the center of the dried and finished solid electrolyte sheet defined with respect to the thickness direction. To be specific, the thickness obtained by subtracting the thickness of the three-dimensional structure from the thickness of the slurry containing the solid electrolyte coated in the fourth step is the thickness of the slurry containing the solid electrolyte coated in the second step.

Fifth Step

The fifth step is to dry the slurry containing the solid electrolyte inside and on top of the three-dimensional structure, thereby forming a solid electrolyte sheet with a three-dimensional structure inside the solid electrolyte layer (see (e) and (f) FIG. 1). The same method as in the second step of this embodiment can be adopted as the drying method. The thickness of the solid electrolyte sheet obtained after drying is preferably 1.5 to 2.5 times the thickness of the solid electrolyte sheet after pressing.

For the solid electrolyte sheet obtained after drying in the fifth step, the removable base may or may not be removed until it is used as a battery component for manufacturing a solid-state battery. After pressing of the solid electrolyte sheet, the positive electrode layer, solid electrolyte sheet, and negative electrode layer are stacked in this order and pressurized, thereby manufacturing a solid-state battery. Solid-state batteries can also be manufactured by stacking the positive electrode layer, solid electrolyte sheet, and negative electrode layer in this order and pressing them.

The method of manufacturing a solid electrolyte sheet of the present invention can be used as the aforementioned method of manufacturing a solid electrolyte sheet, and can also be used as the method of manufacturing a sheet material containing a solid electrolyte such as an electrode layer, making various additions, changes, or deletions without departing from the scope of the invention.

<Solid Electrolyte Sheet

A solid electrolyte sheet according to one embodiment of the present invention has a sheet-like three-dimensional structure that is located in the center defined with respect to the thickness direction and that is filled with solid electrolyte inside; and solid electrolyte layers formed to cover the front and back sides of the three-dimensional structure, respectively. To be specific, the solid electrolyte sheet according to this embodiment is a solid electrolyte sheet manufactured by the method of manufacturing the solid electrolyte sheet according to the embodiment described above. For the solid electrolyte layer and the three-dimensional structure, electrode materials that can be used for the method of manufacturing a solid electrolyte sheet described above can be preferably used.

Figure 3:
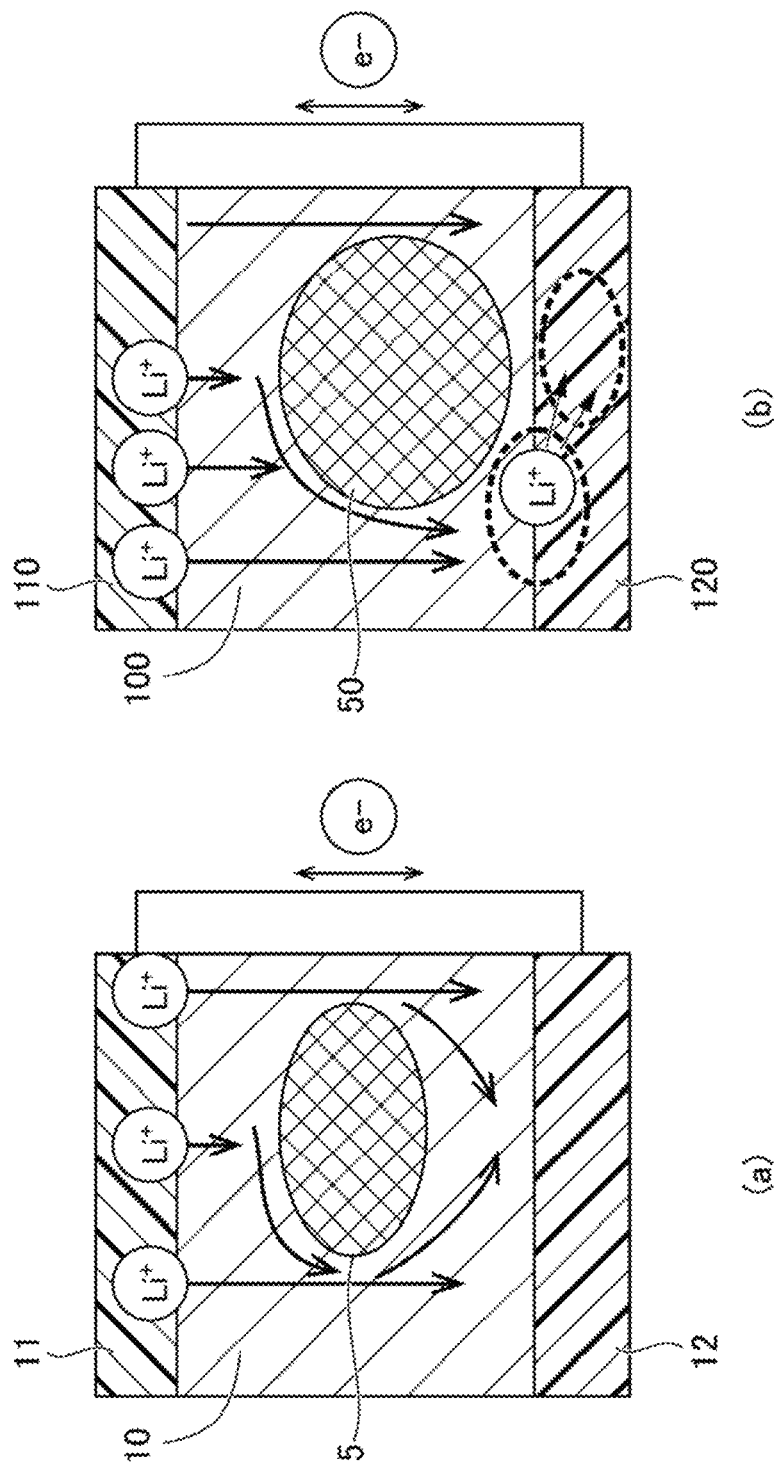
FIG. 3 is a cross-sectional view of a comparison between the solid electrolyte sheet according to the embodiment of the present invention and a conventional solid electrolyte sheet.

FIG. 3 is a cross-sectional view showing a comparison between the solid electrolyte sheet according to this embodiment, and a conventional solid electrolyte sheet. (a) in FIG. 3 shows the solid electrolyte sheet according to this embodiment, and (b) in FIG. 3 shows the conventional solid electrolyte sheet. As shown (b) in FIG. 3, in the conventional solid electrolyte sheet 100, a three-dimensional structure 50, for example, of a non-woven fabric exists near the negative electrode layer 120, so that lithium ions moving from the positive electrode layer 110 to the negative electrode layer 120 are blocked by the three-dimensional structure near the negative electrode layer 120, which slows down the lithium ions. As a result, the insertion and desorption of lithium ions into the electrode are inhibited, increasing the internal resistance and reducing the output performance of the battery.

In contrast, as shown (a) in FIG. 3, in the solid electrolyte sheet 10 according to this embodiment, a three-dimensional structure 5, for example, of a non-woven fabric, is located approximately in its center defined with respect to the thickness direction. Consequently, the lithium ions moving from the positive electrode layer 11 to the negative electrode layer 12 can move along the three-dimensional structure 5 approximately in the center defined with respect to the thickness direction; therefore, their movement is not greatly inhibited and their speed does not greatly decrease. Consequently, the insertion and desorption of lithium ions into the electrodes is smoother than in the conventional one, resulting in improved output performance of the battery.

Therefore, according to the method of manufacturing a solid electrolyte sheet, and the solid electrolyte sheet according to this embodiment, smooth insertion and desorption of lithium ions from the solid electrolyte layer to the electrode improves battery output performance, and improving the bonding between the solid electrolyte layer and the electrode layer suppresses interfacial peeling and short circuiting between the solid electrolyte layer and the electrode layer.

If pressed, the solid electrolyte sheet of this embodiment can be applied to a solid-state battery, serving as a solid electrolyte layer.

The present invention is not limited to the aforementioned embodiment, and covers variations and improvements made without departing from the scope in which the purpose of the present invention can be achieved.

EXAMPLES

Next, examples of the present invention will be described, but the embodiment of the present invention is not limited to these examples.

Example

Preparation of Solid Electrolyte Sheet

Slurry of a solid electrolyte was prepared by mixing the solid electrolyte with a solvent. A solid electrolyte layer was formed on the base by coating a removable base with slurry of the solid electrolyte and then drying it on a hot plate. Next, a non-woven fabric as a three-dimensional structure was placed on the top surface of the solid electrolyte layer, and the slurry of the solid electrolyte was applied again from the top of the three-dimensional structure. The work was then dried on the hot plate again and pressed after the base was removed, thereby yielding the solid electrolyte sheet according to the example. A plurality of solid electrolyte sheets of the example were prepared with different coating thicknesses of the solid electrolyte slurry, and used for the following evaluation tests.

Fabrication of Solid-State Battery

A solid-state battery for evaluation was prepared by stacking a positive electrode layer containing NCM as a positive electrode active material, the aforementioned solid electrolyte sheet, and a negative electrode layer containing graphite as a negative electrode active material in this order, and then pressing the work. The following evaluation tests were conducted using the solid-state battery for evaluation.

Comparative Example

The non-woven fabric as a three-dimensional structure that was used in the example was placed on a removable base, and slurry containing the solid electrolyte prepared in the same way as in Example 1 was coated from top of the non-woven fabric. Subsequently, the work was dried on a hot plate, and the removable base was then removed and the work was pressed to yield a solid electrolyte sheet according to the comparative example. Using the resulting solid electrolyte sheet, a solid-state battery for evaluation was fabricated through the same procedure as in the example. Multiple solid electrolyte sheets of the comparative example were also prepared with different coating thicknesses of the solid electrolyte slurry, and used for the following evaluation tests.

Cross-Sectional SEM Observation

Figure 4:
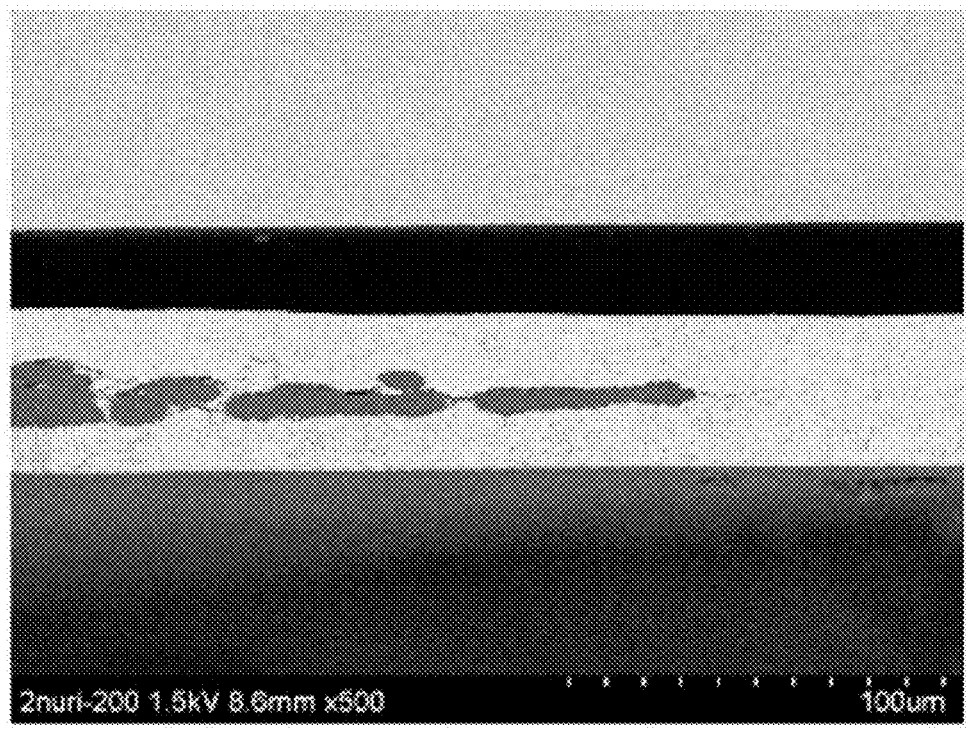
FIG. 4 is a cross-sectional SEM image of the solid electrolyte sheet according to an example.
Figure 5:
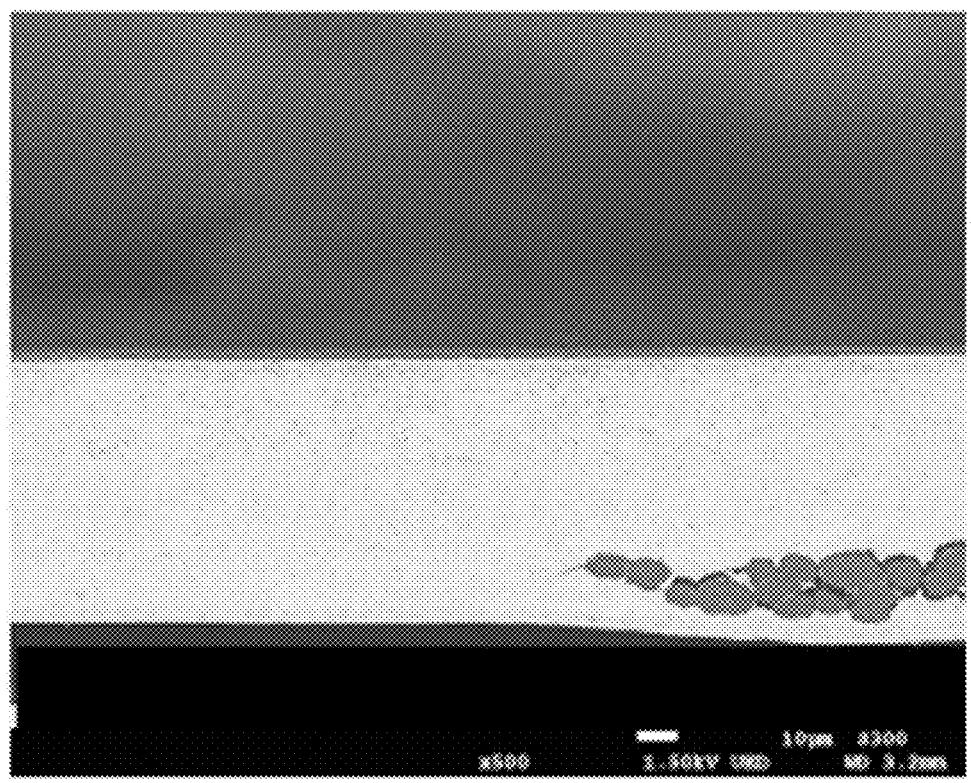
FIG. 5 is a cross-sectional SEM image of the solid electrolyte sheet according to a comparative example.

The obtained solid electrolyte sheets of the example and comparative examples were subjected to cross-sectional SEM observation. FIG. 4 shows a cross-sectional SEM image of the solid electrolyte sheet according to the example. As shown in FIG. 4, regarding the solid electrolyte sheet according to the example, it was confirmed that the non-woven fabric as a three-dimensional structure was located approximately in its center defined with respect to the thickness direction. FIG. 5 shows a cross-sectional SEM image of the solid electrolyte sheet according to the comparative example. As shown in FIG. 5, regarding the solid electrolyte sheet according to the comparative example, it was confirmed that the non-woven fabric as a three-dimensional structure was located near one side.

DC Resistance Measurement Test

The evaluation batteries obtained above were subjected to a DC resistance measurement test. The batteries were discharged with a constant current at 50% SOC and the DC resistance was measured at 10 seconds. The results are shown in FIG. 6.

Figure 6:
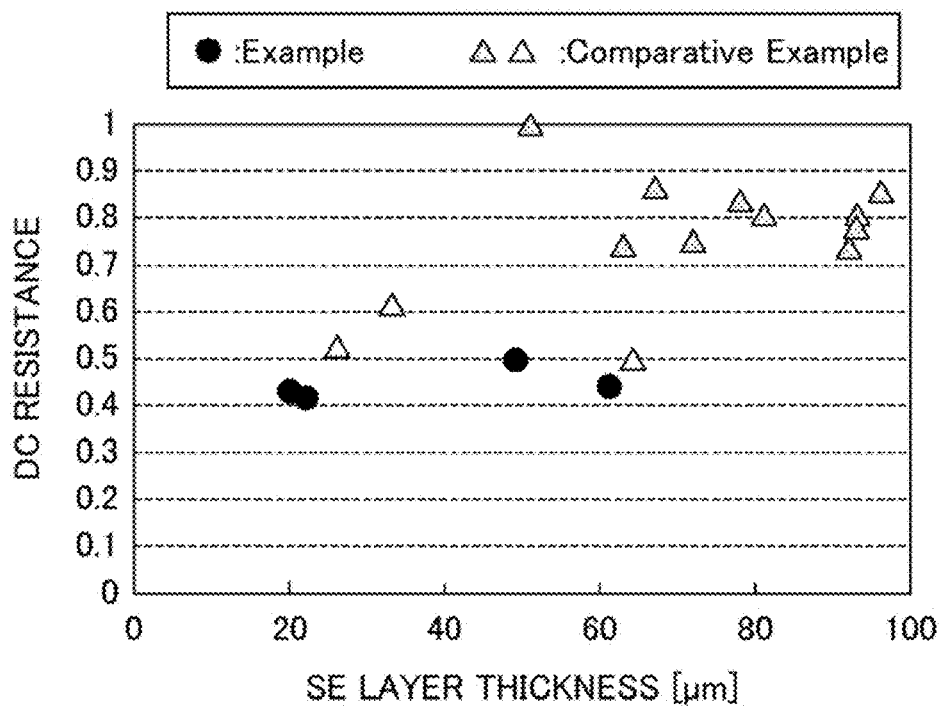
FIG. 6 is a diagram showing the relationship between the thickness and DC resistance of the solid electrolyte sheets according to the example and comparative example.

FIG. 6 shows the relationship between the post-pressing thickness and the DC resistance of each solid electrolyte (SE) sheet in the example and comparative examples. The vertical axis in FIG. 6 indicates each measured value as a relative value where the maximum DC resistance obtained in this test is 1. As shown in FIG. 6, it was confirmed that the solid-state battery using the solid electrolyte sheet according to the example had lower DC resistance than the solid-state batteries using the solid electrolyte sheets according to the comparative examples, regardless of the thickness of each solid electrolyte sheet. The results revealed that the output performance of the battery with the solid electrolyte sheet of the example was improved in compared to that with the solid electrolyte sheets of the comparative examples.

Evaluation Test of Short-Circuit Deterrent Effect

The evaluation batteries obtained above were subjected to a short circuit effect prevention evaluation test. After each evaluation battery was left for 10 days with no current flowing through it at a charge rate (SOC) of 20%, the open circuit voltage was measured. When the voltage between the positive and negative terminals of the solid-state battery was 0.000 V, the battery was determined to have a short circuit. The results are shown in FIG. 7.

Figure 7:
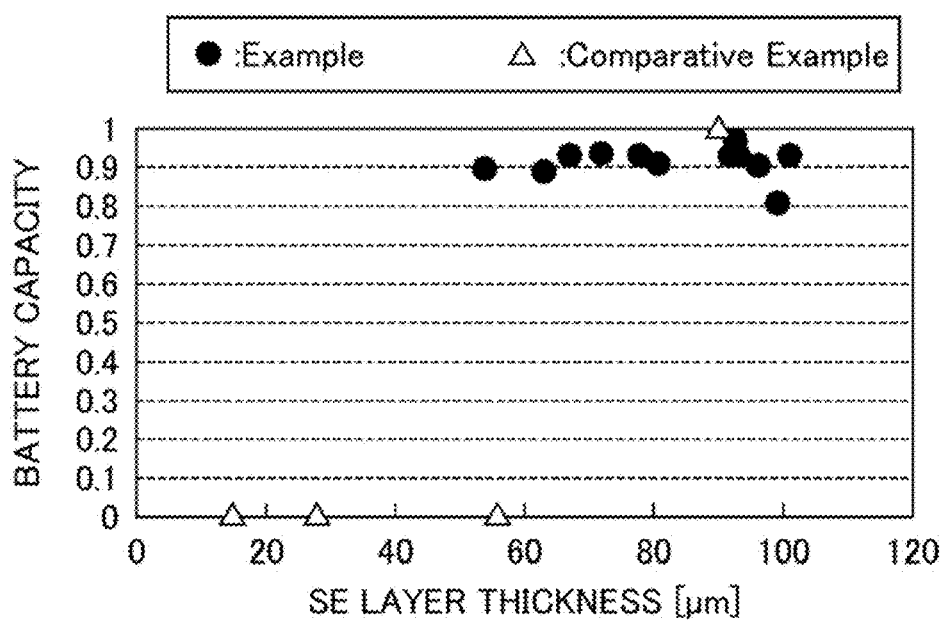
FIG. 7 is a diagram showing the relationship between the thickness and battery capacity of the solid electrolyte sheets according to the example and comparative example.

FIG. 7 shows the relationship between the post-pressing thickness and the battery capacity of each solid electrolyte (SE) sheet in the example and comparative example. The vertical axis in FIG. 7 indicates each measured value as a relative value where the maximum battery capacity obtained in this test is 1. As shown in FIG. 7, it was confirmed that the solid-state battery using the solid electrolyte sheet according to the comparative example short-circuited when the solid electrolyte layer was thinner. In contrast, it was confirmed that solid-state battery using the solid electrolyte sheet according to the example could be a solid-state battery having a high battery capacity without short-circuiting, regardless of the thickness of the solid electrolyte sheet.

EXPLANATION OF REFERENCE NUMERALS

1 Base
2, 20 Slurry of solid electrolyte
3 Blade
4 Dryer
5, 50 Three-dimensional structure
6 Solid electrolyte layer
10 Solid Electrolyte Sheet

What is claimed is:

1. A method of manufacturing a solid electrolyte sheet filled with a solid electrolyte, comprising:
    a first step of coating a base with slurry containing a solid electrolyte;
    a second step of drying the slurry on the base to form a solid electrolyte layer;
    a third step of stacking a three-dimensional sheet structure on a top surface of the solid electrolyte layer;
    a fourth step of coating an inside and a top of the three-dimensional structure with slurry containing a solid electrolyte; and
    a fifth step of drying the slurry coated on the inside and on the top of the three-dimensional structure to obtain a solid electrolyte sheet filled with the solid electrolyte.

2. The method of manufacturing a solid electrolyte sheet according to claim 1, wherein the three-dimensional structure is a non-woven fabric.

* * * * *